(12) United States Patent
Baba

(10) Patent No.: US 6,417,837 B1
(45) Date of Patent: Jul. 9, 2002

(54) COORDINATE INPUT DEVICE

(75) Inventor: Michiru Baba, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 08/989,691

(22) Filed: Dec. 12, 1997

Related U.S. Application Data

(62) Division of application No. 08/336,944, filed on Nov. 10, 1994, now Pat. No. 5,717,610.

(30) Foreign Application Priority Data

Nov. 15, 1993 (JP) .................................. 5-309740

(51) Int. Cl.⁷ .................................................. G09G 5/00
(52) U.S. Cl. ........................................ 345/157; 345/163
(58) Field of Search ................................ 345/157, 158, 345/163, 164, 169, 165

(56) References Cited

U.S. PATENT DOCUMENTS

| | | | |
|---|---|---|---|
| 4,922,444 A | 5/1990 | Baba | 364/566 |
| 4,933,670 A | 6/1990 | Wislocki | 340/709 |
| 5,126,731 A | 6/1992 | Cromer, Jr. et al. | 340/825.19 |
| 5,223,709 A | 6/1993 | Pettypiece, Jr. | 250/229 |
| 5,252,970 A | 10/1993 | Baronowsky | |
| 5,260,696 A | 11/1993 | Maynard, Jr. | |
| 5,287,089 A | 2/1994 | Parsons | |
| 5,287,090 A * | 2/1994 | Grant | 345/163 |
| 5,296,871 A * | 3/1994 | Paley | 345/163 |
| 5,298,919 A | 3/1994 | Chang | |
| 5,313,230 A | 5/1994 | Venolia et al. | |
| 5,329,276 A | 7/1994 | Hirabayashi | 340/870.31 |
| 5,379,053 A | 1/1995 | Steinberg | 345/157 |
| 5,446,481 A | 8/1995 | Gillick et al. | 345/163 |
| 5,473,344 A | 12/1995 | Bacon et al. | 345/163 |
| 5,491,497 A | 2/1996 | Suzuki | 345/157 |
| 5,503,040 A | 4/1996 | Wright | 74/471 X |
| 5,506,605 A | 4/1996 | Paley | 345/163 |
| 5,508,719 A | 4/1996 | Gervais | 345/157 |
| 5,563,631 A * | 10/1996 | Masunaga | 345/169 |

FOREIGN PATENT DOCUMENTS

| | | |
|---|---|---|
| EP | 0346859 | 12/1989 |
| JP | 59-127143 | 7/1984 |
| JP | 4167117 | 6/1992 |
| JP | 4355817 | 12/1992 |
| JP | 82217797 | 12/1993 |
| JP | 6019618 | 1/1994 |
| JP | 83206278 | 5/1994 |
| TW | 7326873 | of 0000 |
| WO | 8808565 | 11/1988 |

* cited by examiner

Primary Examiner—Richard A. Hjerpe
Assistant Examiner—Duc Dinh
(74) Attorney, Agent, or Firm—Pillsbury Winthrop LLP

(57) ABSTRACT

A coordinate input device is provided to contribute to improvements in a mechanical mouse, opto-mechanical mouse and the like which are used to control cursor movements in the visual display unit of a computer system. The device comprises a position sensor and a pressure sensor. The position sensor detects a two-dimensional position of the device, which is moved on a flat surface or the like by a person, so as to produce two-dimensional coordinates. The pressure sensor detects a pressing force applied to the device by the person. Hence, the two-dimensional coordinates and the pressing force detected are used as parameters which control a cursor or a graphic image displayed on the screen of the visual display unit. The pressure sensor comprises an air-pressure sensor which detects a change of air pressure caused by the pressing force applied to the device. In addition, the pressure sensor can be replaced by a grip sensor which detects gripping force applied to the device by the person.

2 Claims, 5 Drawing Sheets

COORDINATE INPUT DEVICE

This is a division of application Ser. No. 08/336,944, filed Nov. 10, 1994, now U.S. Pat. No. 5,717,610, which application is hereby incorporated by reference in its entirety.

BACKGROUND OF THE INVENTION

1. Field of the Invention

The present invention relates to a coordinate input device, and more particularly to a mouse whose movements on a flat surface are reflected by cursor movements on a visual display unit of a computer system.

2. Prior Art

Conventionally, a coordinate Input device such as a mouse is widely used for computer systems in business use for office work, engineering and the like, as well as for personal use in playing video games, drawing pictures or making documents containing tables. This device is useful for inputting two-dimensional coordinates, which designate a location to input a character on the screen or a location to start drawing a picture on the screen. Normally, the cursor displayed on the screen of the visual display unit is controlled in its location or coordinates by that device.

FIG. 2A is a sectional view showing a mechanical structure of the coordinate input device as conventionally known. This is a so-called mechanical mouse in which a rubber-coated ball 22 is rolling on a flat surface 31 so that the amounts of movement in X and Y directions are detected. Those movements are reflected by the two-dimensional movements of the cursor on the screen. This type of mouse is frequently used in the personal computer system.

In this device, a substrate 21 is fixedly located inside of a main body 20. Due to the provision of the main body 20, the substrate 21 and a ball-positioning member 24, the ball 22 is located at a certain position such that the ball 22 can rotate in any direction. The rotation of the ball 22 is converted into the location of the device on the flat surface 31.

FIG. 2B shows a construction of a rotation detector 26. Herein, a slit disk 34 is attached to an axis 32 such that the slit disk 34 can rotate about the axis 32. A plurality of slits are formed in the peripheral portion of the slit disk 34 at equal Intervals. A light-emitting element 36 is placed against a light-receiving element 38 with respect to the slit disk 34. The detection for the rotation of the ball 22 is activated when the operator moves the device in a certain direction on the flat surface 31 so that the ball 22 is correspondingly rotated. An edge portion of the slit disk 34 normally comes in contact with the ball 22; hence, the slit disk 34 should be rotated about the axis 32 by a certain amount of rotation in response to the rotation of the ball 22. The light emitted from the light-emitting element 36 passes through the slit to reach the light-receiving element 38. Since the slit disk 34 rotates responsive to the rotation of the ball 22, the light should intermittently reach the light-receiving element 38; in other words, the light-receiving element 38 receives a certain number of pulses of light in accordance with the rotation of the slit disk 34. The number of the pluses of light, received by the light-receiving element 38, is proportional to the amount of rotation of the ball 22 in a certain direction. The rotation detector 26, as shown in FIG. 2B, is provided for each of the X and Y directions; hence, it is possible to detect the amount of rotation of the ball 22 with respect to each of the X and Y directions. The pulses of light, received by the light-receiving element 38, are converted Into electric signals by a movement detecting means 28; and then, those electric signals are outputted from the device.

FIG. 3 is a sectional view showing a mechanical structure of another coordinate input device as conventionally known. This is a so-called opto-mechanical mouse having an optical detection means 46 by which the movements thereof are detected by reading a pattern written on a pad 40 so as to compute the amounts of movement in X and Y directions by a data conversion means 48.

Both of the devices described above are capable of obtaining coordinate information regarding the X and Y directions on the flat surface. In addition, those devices provide one or two buttons 29 and 49 as well. The buttons 29 and 49 are respectively connected with click detectors 30 and 50 which are fixedly located inside of the main body 20. The click detectors 30 and 50 detect ON/OFF states of the buttons 29 and 49 respectively, so that conversion means (not shown) converts the ON/OFF states detected into electric signals, which are outputted from the device. Further, the application program, executed by the computer, determines how the buttons function. For example, a task to select a specific function is assigned to one button, while a task to correct a specific item is assigned to another button.

The coordinate input devices conventionally known are useful in providing sufficient information regarding a two-dimensional coordinates system. Recently, however, videogame software or multimedia systems require more complicated movements for the cursor or graphic image on the screen. In some cases, three-dimensional movements are required. In that case, the conventional coordinate input device cannot sufficiently satisfy those needs.

When inputting a size or an intensity as a parameter regarding a certain object to be controlled on the screen, the conventional device inputs such parameter by detecting the time when the button is pushed or a duration in which the button is continuously pushed. Such indirect detection should be made by the conventional device because of the limited mechanism of the device. In that case, however, a change of the parameter on the screen which is caused by the conventional device does not precisely match the operator's intention. In other words, to precisely match the change of the parameter with the operator's intention, the operator should be skilled in manipulating the device. Therefore, the conventional device is not designed for people who are not skilled in manipulating the device. In addition, the conventional device cannot establish a good relationship between the screen image and the manipulation thereof.

SUMMARY OF THE INVENTION

It is an object of the present invention to provide a coordinate input device which is capable of inputting a variety of parameters with high performance.

The present invention provides improvements for coordinate Input devices such as the mechanical mouse, opto-mechanical mouse or the like which are used to control cursor movements in the visual display unit of the computer system. The coordinate input device according to the present invention comprises a position sensor and a pressure sensor. The position sensor detects a two-dimensional position of the device, which is moved on a flat surface or the like by a person, so as to produce two-dimensional coordinates. The pressure sensor detects pressing force applied to the device by the person. Hence, the two-dimensional coordinates and the pressing force detected are used as parameters which control a cursor or a graphic image displayed on the screen of the visual display unit.

The pressure sensor comprises an air-pressure sensor which detects a change of air pressure caused by the pressing force applied to the device. In addition, the pressure sensor can be replaced by a grip sensor which detects grip force applied to the device by the person.

BRIEF DESCRIPTION OF THE DRAWINGS

Further objects and advantages of the present invention will be apparent from the following description with reference to the accompanying drawings clearly showing the preferred embodiments of the present invention.

In the drawings.

DETAILED DESCRIPTION OF THE PREFERRED EMBODIMENTS

Figure 1:
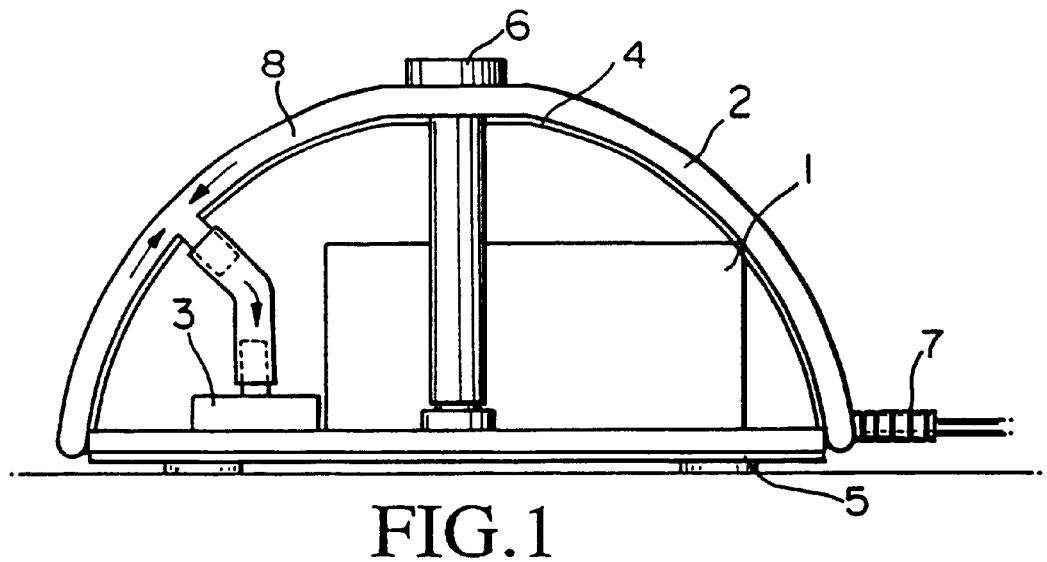
FIG. 1 is a sectional view illustrating a mechanical structure of a coordinate input device according to a first embodiment of the present invention.

FIG. 1 is a sectional view illustrating a mechanical structure of a coordinate input device according to a first embodiment of the present invention. Herein, a numeral 1 denotes a position sensor which detects the movements thereof in the X and Y directions: and a numeral 2 denotes an air layer which is sealed by a pump 8. The pump 8 is made by specific material by which a part of the pump 8 or an overall portion of the pump 8 is made flexible. The air layer 2 is placed outside of an upper case 4 which is provided to protect an internal mechanism of the device. When an operator holds or grasps the upper case 4, a certain air pressure occurs in the air layer 2. A numeral 3 denotes an air-pressures sensor, a part of which is connected with a part of the air layer 2 sealed. Hence, the air-pressure sensor 3 can detect a change of the air pressure which occurs in the air layer 2. A numeral 5 denotes a lower casing; a numeral 6 denotes a push button which is pushed by the operator; and a numeral 7 denotes a cable by which a variety of information created by the device is transmitted to an external device or the like. As the position sensor 1, it is possible to use a speed sensor which acts responsive to the inertia. In that case, the device can be moved in the space without being supported by a flat pad or the like.

Figure 2A:
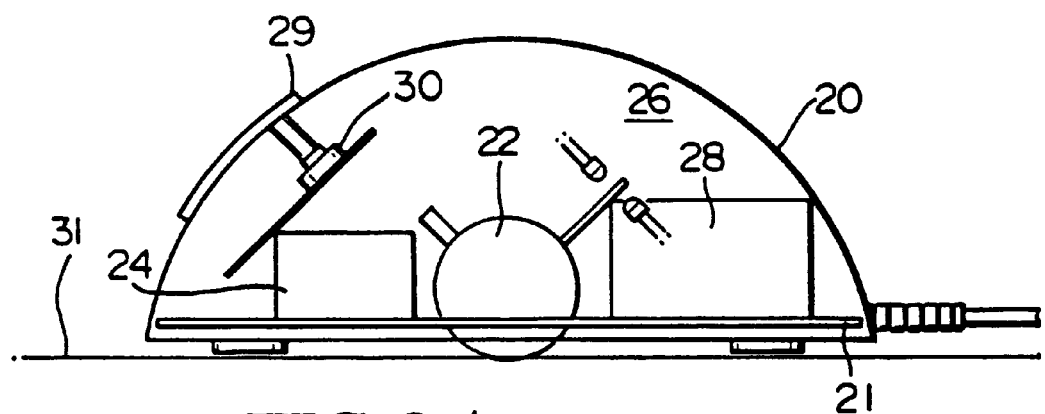
FIG. 2A is a sectional view illustrating a mechanical structure of the mechanical mouse which is an example of the coordinate input device conventionally known.
Figure 2B:
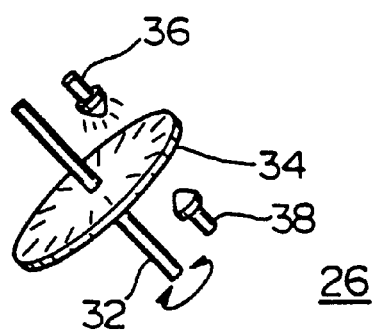
FIG. 2B is a perspective view illustrating a construction of a rotation detector which is equipped in the mouse shown in FIG. 2A.
Figure 3:
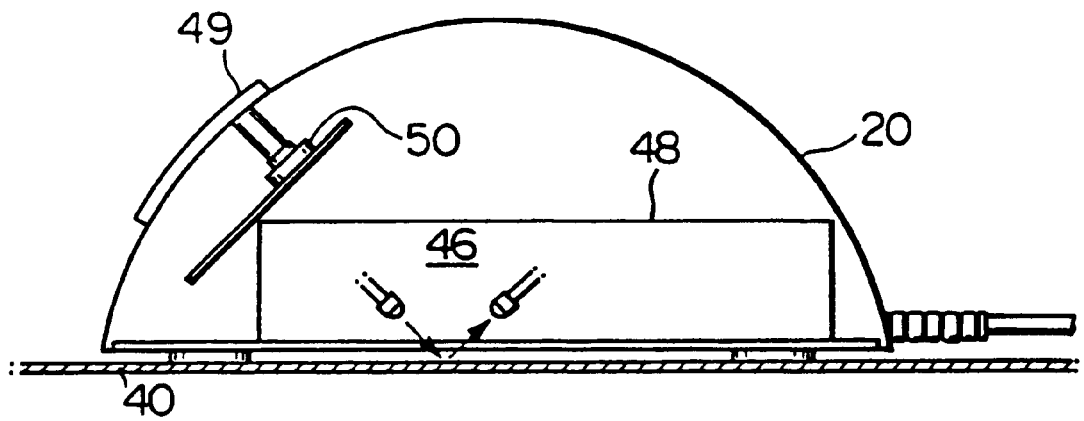
FIG. 3 is a sectional view illustrating a mechanical structure of the opto-mechanical mouse which is another example of the coordinate input device conventionally known.

The position sensor 1 is embodied by a sensor whose output is proportional to the amount of movement or the speed in each of the X and Y directions in the two-dimensional coordinates system. Therefore, it is possible to use a mechanical-type sensor or an optical-type sensor as similar to one of the coordinate input devices shown in FIGS. 2A, 2B and 3. In addition, the first embodiment shown in FIG. 1 provides the air-pressure sensor 3, detecting the air pressure which responds to the operator's action to grasp the upper case 4. Therefore, the first embodiment is advantageous in that a variety of expressions can be realized on the screen. For example, when controlling a graphic image which represents an animated character in the video game to be played on the screen, the first embodiment can offer the three-dimensional movements as well as the two-dimensional movements on the screen. By manipulating the device according to the first embodiment, it is possible to control the animated character to stoop down, throw back its head or jump. In addition, it is possible to control the power to move the animated character, control the loudness of the sounds, and continuously change the moving speed of the animated character. In short, it is possible to control the movements of the animated character on the screen in real time, affording realism.

Figure 4:
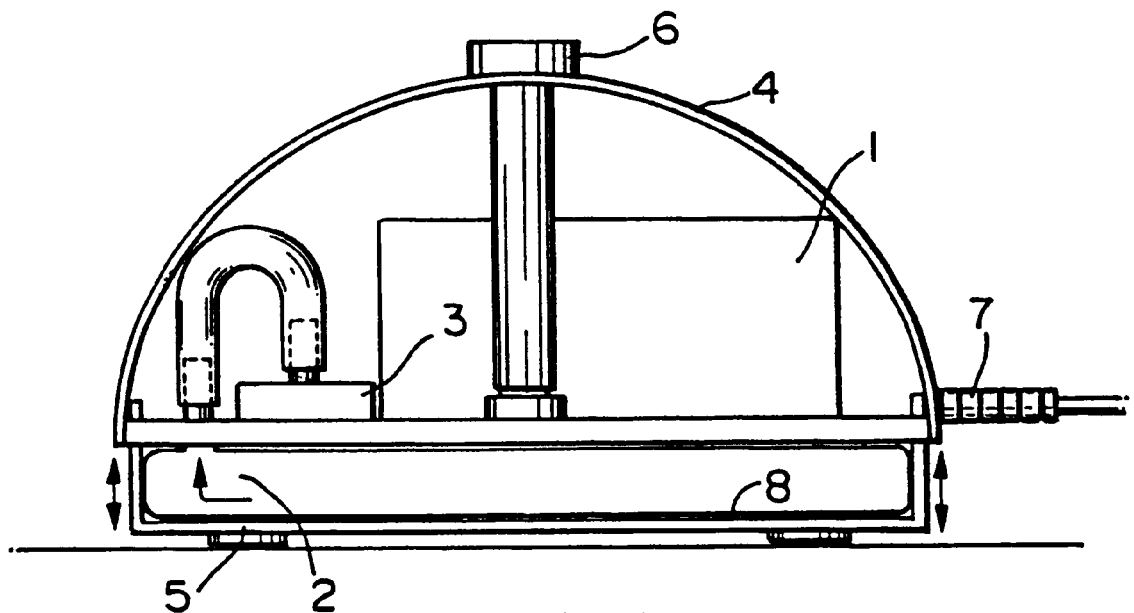
FIG. 4 is a sectional view illustrating a mechanical structure of a coordinate input device according to a second embodiment of the present invention.

FIG. 4 is a sectional view illustrating a mechanical structure of a coordinate input device according to a second embodiment of the present invention. Herein, the parts corresponding to those shown in FIG. 1 are designated by the same numerals; hence, the description thereof will be omitted. As compared to the first embodiment, the second embodiment is characterized by the sealed air layer 2 located inside of the lower case 5. When the operator pushes down the upper case 4, the air layer 2 is compressed and the resulting change in air pressure is detected by the air-pressure sensor 3.

Figure 9:
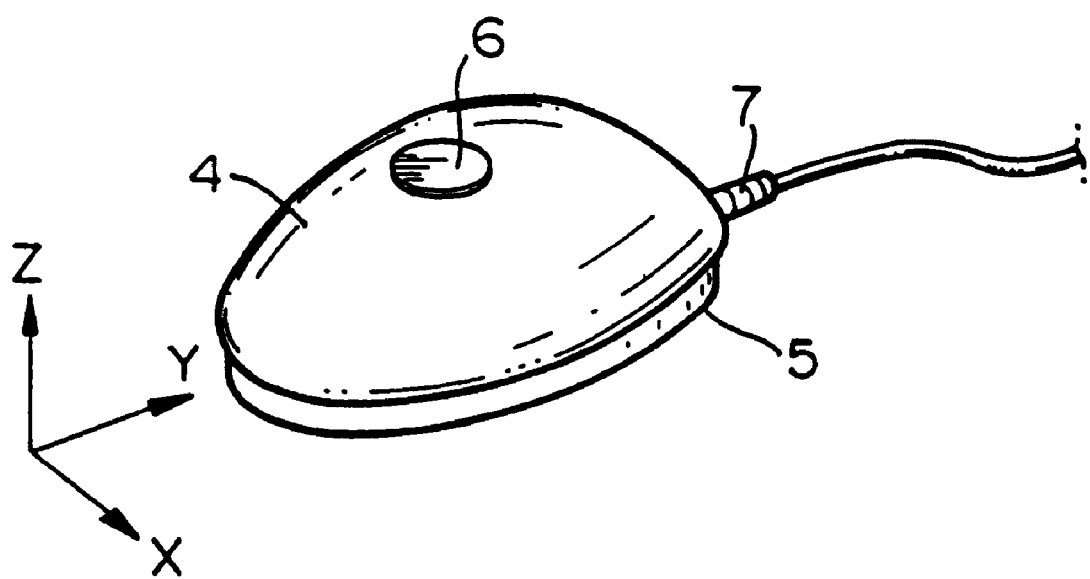
FIG. 9 is a perspective view illustrating an appearance of the coordinate input device shown in FIG. 4.

FIG. 9 is a perspective view illustrating the appearance of the coordinate input device shown in FIG. 4. According to the second embodiment, by merely operating and moving the coordinate input device on the flat pad, it is possible to obtain information representative of the parameter regarding a Z direction, which is a vertical direction against the flat pad, as well as the Information regarding the two-dimensional parameters (i.e., the X- and Y-direction movements) of the device moved on the flat pad. In other words, the second embodiment can provide three-dimensional parameters.

Figure 5:
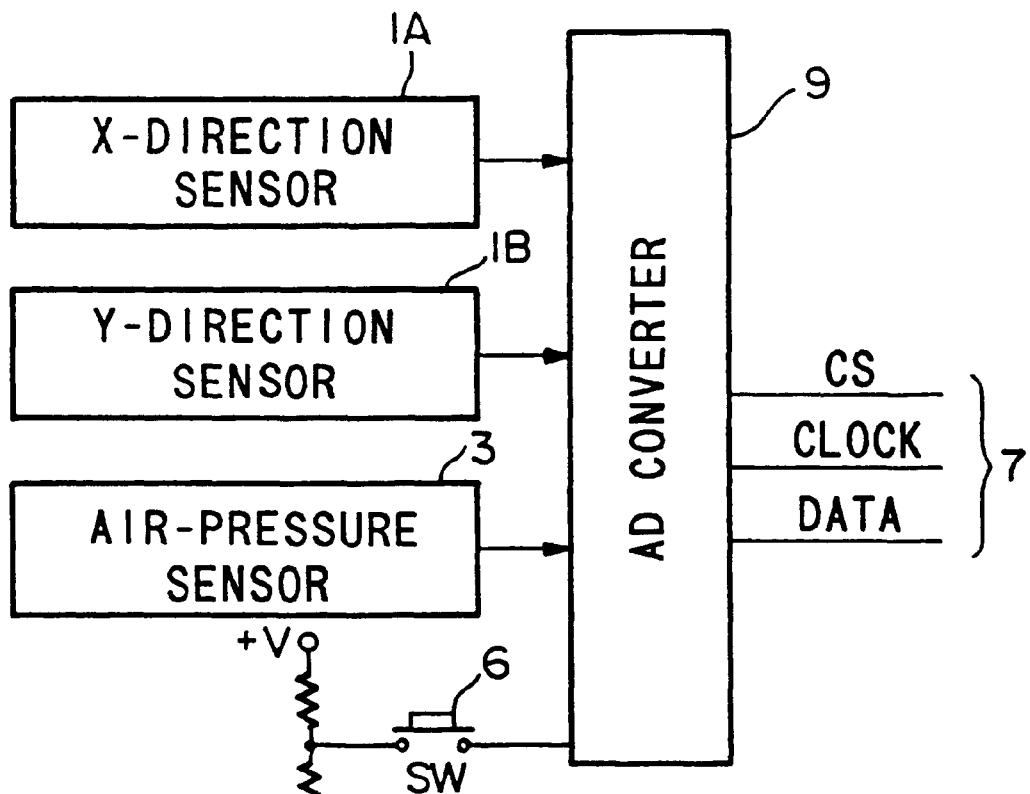
FIG. 5 is a block diagram showing an electric configuration of the coordinate input device.

FIG. 5 is a block diagram showing an electric configuration of the coordinate input device. Herein, the parts corresponding to those shown in FIGS. 1 and 4 are designated by the same numerals. The position sensor 1 consists of two sensors, i.e., an X-direction sensor 1A and a Y-direction sensor 1B. A numeral 9 denotes an AD converter which receives analog outputs of the X-direction sensor 1A, the Y-direction sensor 1B and the air-pressure sensor 3. Therefore, those analog outputs are converted into digital data by the AD converter 9, so that the digital data are transmitted through the cable 7.

Figure 6:
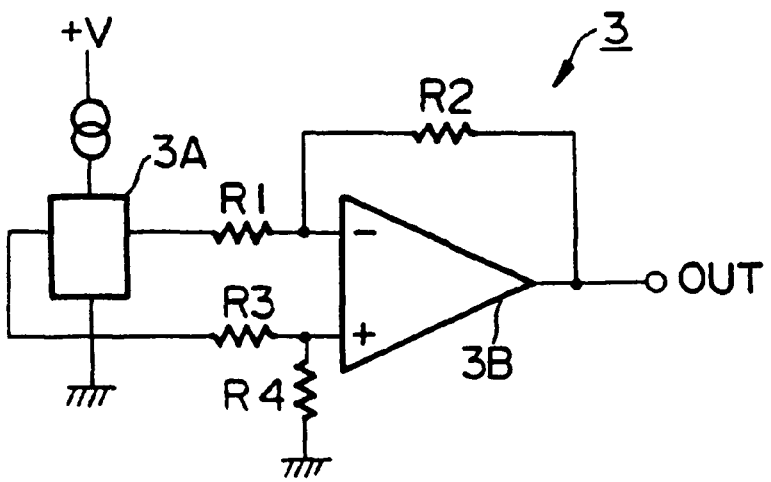
FIG. 6 is a circuit diagram showing an electric configuration of an air-pressure sensor which is provided in the coordinate input device.

FIG. 6 is a circuit diagram showing an electric configuration of the air-pressure sensor 3. The air-pressure sensor 3 is configured by a pressure-sensitive element 3A, an operational amplifier 3B and resistors R1–R4. The pressure-sensitive element 3A produces an analog voltage which is proportional to a pressure difference between the internal pressure of the air layer 2 and the atmospheric pressure, wherein the Internal pressure of the air layer 2 is changed when the operator grasps the upper case 4 shown in FIG. 3. The operational amplifier 3B and the resistors R1–R4 are assembled to form a differential amplifier. Hence, the analog voltage, which is produced responsive to the pressure difference described above, is amplified by the amplifier so as to produce a dc voltage which is outputted from the air-pressure sensor 3.

Figure 7:
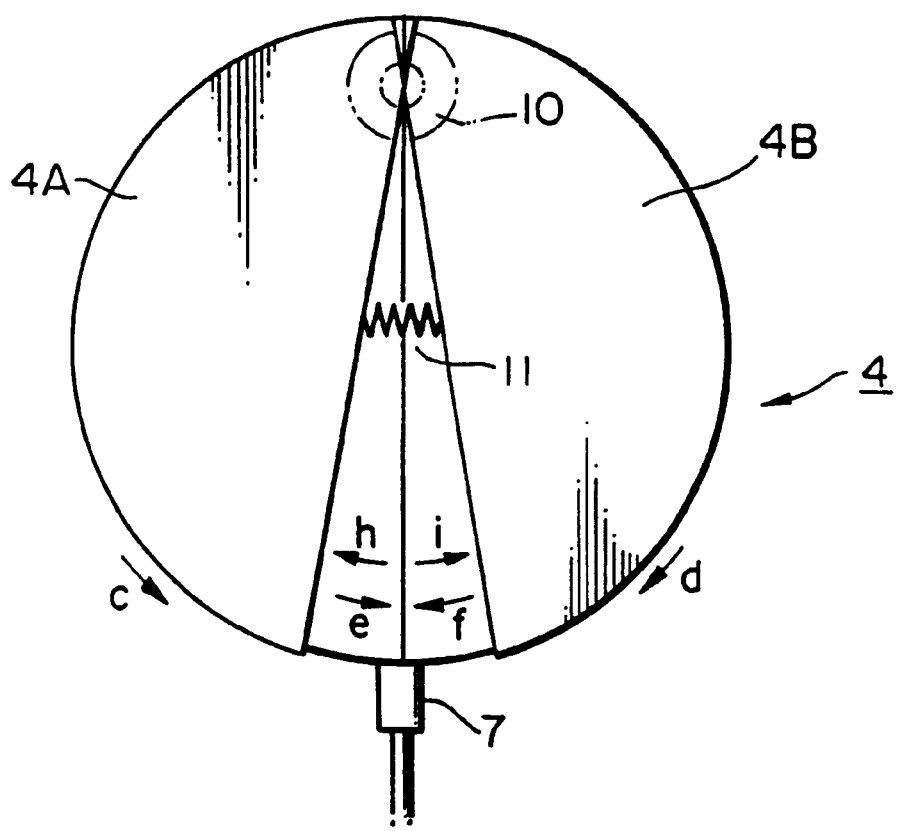
FIG. 7 is a plan view illustrating a coordinate input device according to a third embodiment of the present invention.

FIG. 7 is a plan view illustrating a coordinate input device according to a third embodiment of the present invention. The third embodiment is characterized by providing a grip sensor, wherein a grip force applied to the upper case 4 is not reflected by the change of the air pressure but by the mechanical rotation. Hence, a rotation angle, which is changed responsive to the rotation force corresponding to the grip force applied to the upper case 4, is converted into voltage change. In FIG. 7, the upper case 4 is divided into two sections, 4A and 4B, which are rotatably moved in opposite directions (see arrows 'c', 'd','e 'and 'f') about a rotation center 10 in response to the force to grasp those sections 4A and 4B. The rotation center 10 includes a variable resistor VR whose resistance is varied responsive to pressure applied thereto. Hence, when the operator grasps the upper case 4, certain pressure is applied to the variable resistor VR so that its resistance is changed. The change of the resistance is converted into the voltage change. Further, a numeral 11 denotes a spring which is provided between the two sections 4A and 4B.

Figure 8:
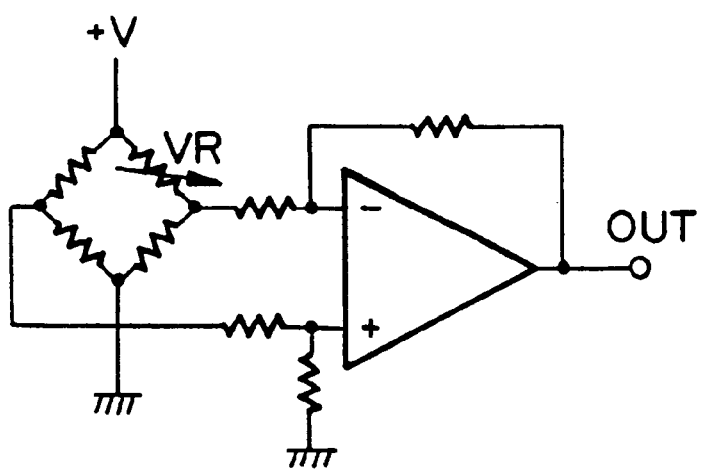
FIG. 8 is a circuit diagram showing an electric configuration of a grip sensor which is provided in the coordinate input device shown in FIG. 7.

FIG. 8 is a circuit diagram showing an electric configuration of the grip sensor which contains a resistor bridge circuit including the variable resistor VR. When the operator grasps the upper case 4 so that the resistance of the variable resistor VR is changed, a resistance balance of the bridge circuit is altered, which is detected and is amplified by the amplifier. Hence it is possible to obtain the voltage change which responds to the grip force applied to the upper case 4.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A coordinate input device comprising:

an upper casing divided into two sections which rotatably move about a rotation center in response to a grip force applied to the upper casing;

a variable resistor having a resistance that changes in response to the grip force applied to the upper casing; and an amplifier circuit having a resistor bridge circuit, wherein the resistor bridge circuit includes the variable resistor which is used to transmit an electrical signal in response to the grip force applied to the upper casing.

2. A coordinate input device in accordance with claim 1, further comprising:

a position detecting device that detects a two-dimensional position of the coordinate input device to produce two-dimensional coordinate values.

* * * * *